April 14, 1936.  W. J. MORRILL  2,037,532

INDUCTION MOTOR SECONDARY

Filed Nov. 2, 1934

Inventor:
Wayne J. Morrill,
by Harry E. Dunham
His Attorney.

Patented Apr. 14, 1936

2,037,532

UNITED STATES PATENT OFFICE 2,037,532

INDUCTION MOTOR SECONDARY

Wayne J. Morrill, Fort Wayne, Ind., assignor to General Electric Company, a corporation of New York Application November 2, 1934, Serial No. 751,177

8 Claims. (Cl. 172—120)

My invention relates to induction motors, and in particular to squirrel cage secondary members therefor, and its object is to improve the starting characteristics of such motors.

It is known that, if the number of bars in the secondary of a squirrel cage induction motor becomes great, i. e., a large number of bars per pole, the effectiveness of the rotor as a secondary to the primary space harmonics is increased. If such harmonics are present this results in currents flowing in the secondary having a distribution other than that of the fundamental number of poles. The result of these harmonic secondary currents is detrimental in that they cause low points in the speed torque curve of the motor which may cause the motor to stick at some harmonic speed below that desired or, if they do not cause sticking at a low speed, they continue to exert their influence at normal speed and make themselves apparent as a negative torque causing the efficiency of the motor to be lowered and the torque to be reduced.

It is the primary object of my invention to provide a secondary for induction motors which, so far as the harmonics are concerned, has the effect of a small number of bars such that there is no secondary circuit in which harmonic currents will flow effectively, but which maintains the effect, so far as the fundamental primary flux is concerned, of having a large number of bars per pole in the squirrel cage secondary which is desirable for an efficient motor design. I accomplish this result by dividing the secondary winding into a number of electrically independent circuits in which secondary currents of fundamental distribution may flow. These circuits evenly overlap so that the effect of a large number of secondary bars per pole is obtained with respect to the fundamental secondary current distribution, but secondary circuits properly spaced for harmful harmonic secondary current distribution are absent. I accomplish this result in such a way that the secondary winding may be formed by a single casting operation. The advantage of cast secondary windings, such as ruggedness and economy of manufacture, are thus retained.

Figure 1:
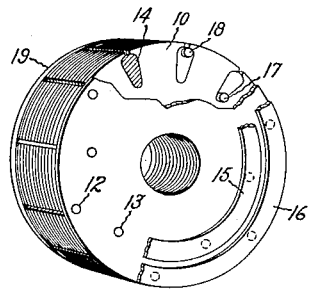
Figure 2:
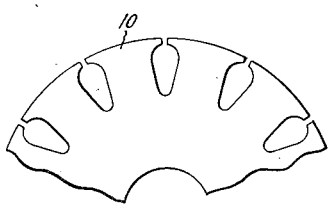
Figure 3:
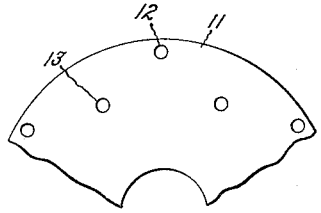
Figure 4:
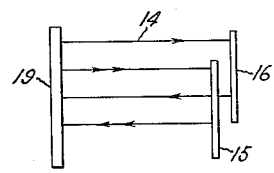
Figure 5:
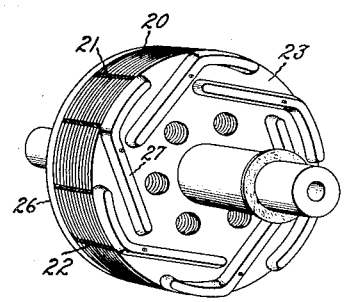

The features of my invention which are believed to be novel and patentable will be pointed out in the claims appended hereto. For a better understanding of my invention, reference is made in the following description to the accompanying drawing in which Fig. 1 illustrates an induction motor secondary rotor member embodying my invention having a double end ring at one end of the rotor with certain parts cut away to more clearly illustrate the construction; Fig. 2 shows the form of rotor lamination and Fig. 3 one form of end plate used in the rotor construction of Fig. 1; Fig. 4 illustrates the secondary current distribution obtained in the type of rotor shown in Fig. 1; Fig. 5 illustrates a secondary rotor with a phase winding cast in place and embodying my invention; and Figs. 6 and 7, respectively, show the style of rotor laminations and an end plate employed in the rotor of Fig. 5.

Referring now to Fig. 1, the rotor is built up of slotted magnetic laminations 10 of usual form, such as shown in Fig. 2. At one end of the rotor, the right-hand end in the illustration, there is placed a plate 11 having openings opposite each rotor slot. The openings 12 opposite alternate rotor slots are on a different radius than the openings 13 opposite the remaining rotor slots. At 14, there is shown a section of one of the squirrel cage rotor bars. The openings 12 in the end plate 11 come opposite the upper portion of such bars while the openings 13 come opposite the lower portion of such bars, the bars being made deep enough for this purpose. Outside the plate 11 there are two end rings 15 and 16, the end ring 15 registering with the inner circle of openings 13 and the end ring 16 covering the outer circle of openings 12 in the end plate 11. Alternate squirrel cage bars may be thus connected through openings 13 to end ring 15, as indicated by the extension at 17, and the remaining bars are connected through openings 12 to end ring 16 by such extensions as indicated at 18. At the opposite end of the rotor, all of the bars 14 are connected to a common end ring 19. The overlapping but electrically independent series of secondary circuits thus formed are represented in Fig. 4.

The complete secondary winding may be cast in one operation as an integral mechanical structure, the end-plate 11 with its two sets of openings 12 and 13 on different radii serving to selectively divide the bars into two groups connected to end rings 16 and 15, respectively. The laminations 10 and the plate 11 may be treated to have an insulating film at the surfaces contacting with the squirrel cage bars 14 to prevent short-circuits between bars of the electrically independent circuits.

It will be evident that detrimental harmonic currents cannot flow through a circuit comprising adjacent bars or comprising bars spaced three bars apart, for example, but that secondary currents of fundamental distribution corresponding to alternate bar spacing will flow and that such circuits are electrically similar and overlapped so that the bar space is fully utilized as in a rotor having a large number of squirrel cage bars per pole, and the torque will be uniform in all rotor positions. If it is desired to have a fundamental current distribution corresponding to a spacing of three bars, three end rings at one end of the rotor may be used, but it will generally be more economical to go to the construction represented in Fig. 5 where a phase-winding effect is obtained with a cast secondary winding construction.

Figure 6:
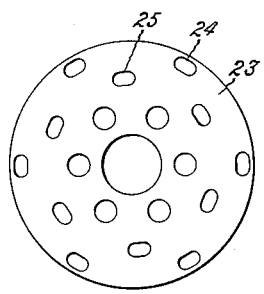
Figure 7:
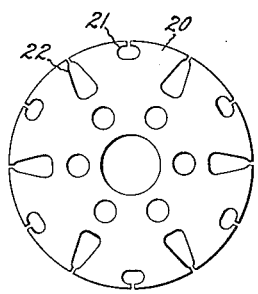

The rotor of Fig. 5 is built up of magnetic laminations 20 of the form shown in Fig. 7, having alternate shallow slots 21 and alternate deeper slots 22. An end plate 23 of the form shown in Fig. 6 is provided having two circular rows of openings 24 and 25 at different radii spaced and positioned to come opposite the two sets of rotor slots 21 and 22 when the end plate is assembled with the rotor laminations as in Fig. 5. Now a secondary winding may be cast in place, such winding having an end ring 26 at one end of the rotor which is common to all of the winding bars which fill the two sets of slots 21 and 22.

At the other end of the rotor, a number of end connections 27 are provided for individually connecting together the ends of deep and shallow bars which are spaced three slots apart. Thus, in Fig. 5, the end connection 27 is connected at one end through an opening 25 in end plate 23 to the end of a deep bar in deep slot 22 and, at the other end, it is connected through an opening 24 in end plate 23 to the end of a shallow bar in shallow slot 21. There are no openings in end plate 23 in line with this particular end connection 27 opposite the two intermediate slots so that the only connections between the rotor bars and such end connection are at its two ends.

It will be understood that, in the casting process, a mould is used having cavities of the shape and disposition of the end connections shown.

Prior to a casting operation, the end plate 23 and the mould are properly oriented on the end of the rotor to communicate with the proper slots in the rotor laminations to form the winding connections described when the molten metal is introduced in the casting operation.

In effect, a phase winding is thus produced in which evenly overlapping secondary winding circuits displaced by three bars are obtained. Currents of harmonic distribution attempting to flow in adjacent or alternate bars are, of course, absent because there are no circuits corresponding to such distribution.

With respect to currents of fundamental distribution corresponding to three-bar spacing, the winding is equivalent to a straight squirrel cage winding having an equal number of bars. Thus, I retain the desirable results of many bars in the rotor but avoid the parasitic harmonic currents that would ordinarily flow in a squirrel cage winding of the same number of bars. These results are obtained in a rotor in which the winding is of a form that may be cast with the resulting economy and ruggedness of this type of construction. The overlapping circuits are similar and evenly spaced so that uniform torque in all rotor positions is obtained.

The rotor embodying this invention may have the bars spiraled or not as desired. An even number of slots and bars is used. It is particularly advantageous for use with stators likely to produce heavy harmonics. The salient pole shaded pole stator is a good example where a rotor embodying my invention will often prove of considerable advantage in reducing the tendency of the rotor to stick at low speeds and in improving the efficiency at normal speeds.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. An induction motor secondary comprising a magnetic core member having slots therein, conductor bars in all of said slots, an end ring connecting all of said conductor bars at one end of the secondary, and connections between the bars at the opposite end of the secondary so arranged as to form a plurality of similar overlapping closed circuits through said bars and end connections, which circuits include all of said bars, the bars in any such closed circuit being spaced apart a distance greater than the distance between adjacent bars.

2. An induction motor secondary comprising a laminated magnetic core containing uniformly spaced peripheral slots, a cast secondary winding on said core comprising bars in all of said slots and end connections between different bars at opposite ends of said secondary, the end connections forming with said bars a plurality of electrically similar overlapping closed circuits inclusive of all of said bars and with bars in adjacent slots in electrically independent circuits.

3. A rotor secondary for induction motors comprising a laminated core provided with evenly spaced slots, an end plate at one end of said rotor having a circular group of openings registering with alternate slots on a given radius and having a second circular group of openings registering with the remaining slots on a different radius, and a cast secondary winding on said rotor comprising bars in said slots, an end ring connecting all of said bars at the end opposite said end plate and end connections outside said end plate connecting with selected bars through selected openings in said end plate to complete a plurality of similar overlapping closed circuits through said bars and end connections, the bars included in any such closed circuit being separated by at least the distance between alternate rotor slots.

4. A rotor secondary for induction motors comprising a laminated core containing peripheral slots and a cast secondary winding thereon comprising bars in said slots and end connections forming with said bars a plurality of electrically independent but electrically similar squirrel cage windings, each such winding containing evenly spaced bars which are spaced from each other by a number of slots equal to the number of such windings.

5. A rotor secondary for induction motors comprising a laminated magnetic core having a plurality of evenly spaced similar slots, an end plate thereon having openings registering with each rotor slot, alternate ones of said openings in said end plate being on one circle and the remainder of said openings therein being on a circle of a different radius, and a cast secondary winding on said rotor formed of bars in said slots, two end rings at one end of said rotor separated from the slotted core by said end plate, one of said end rings registering with one circle of said openings in the end plate and connected therethrough to alternate bars and the other end ring registering with the other circle of said openings in said end plate and connected therethrough to the remaining bars, and an end ring connecting all of said bars at the opposite end of the rotor, said construction forming two electrically similar squirrel cage windings each having electrically independent overlapping closed circuits.

6. A secondary rotor for induction motors comprising a laminated core member having a plurality of similar evenly spaced deep slots, an end plate at one end of said rotor having openings registering with each rotor slot, said openings being on a plurality of circles of different radii, the openings in each circle being evenly spaced and the openings in different circles registering with different slots, a cast secondary winding on said rotor comprising bars in each slot, end rings at said end of the rotor and registering with each circular group of openings in said end plate and connected through said openings to the bars in the slots which register therewith, and an end ring at the opposite end of the rotor connecting all of said bars, said construction forming a plurality of electrically similar squirrel cage windings each having electrical independent evenly overlapping closed circuits.

7. An induction motor secondary member comprising a core member provided with an even number of evenly spaced slots, a secondary winding having bars in all of said slots, an end ring connecting all of said bars at one end of the secondary and connections at the other end of the secondary between bars which are spaced apart the distance of an uneven number of slots greater than 1 for connecting said bars into a plurality of similar electrically independent evenly overlapping closed circuits, which circuits include all of said bars.

8. A secondary rotor member for induction motors comprising a core member provided with deep and shallow slots which are evenly spaced with the deep slots alternating with the shallow slots, an end plate having a circular row of openings registering with the shallow slots, and a circular row of openings on a smaller radius than the first row registering with the deep slots, and a cast secondary winding comprising bars filling said slots, an end ring connecting all of said bars at the end opposite said end plate, and a plurality of connections outside said end plate connecting non-adjacent bars in deep and narrow slots through the openings in said end plate to provide a secondary winding having a plurality of electrically independent evenly overlapping electrically similar closed circuits.

WAYNE J. MORRILL.